No. 764,960. PATENTED JULY 12, 1904.
W. ROURKE.
FITTING FOR PREVENTING SIDE SLIP IN MOTOR VEHICLES.
APPLICATION FILED NOV. 20, 1903.
NO MODEL.
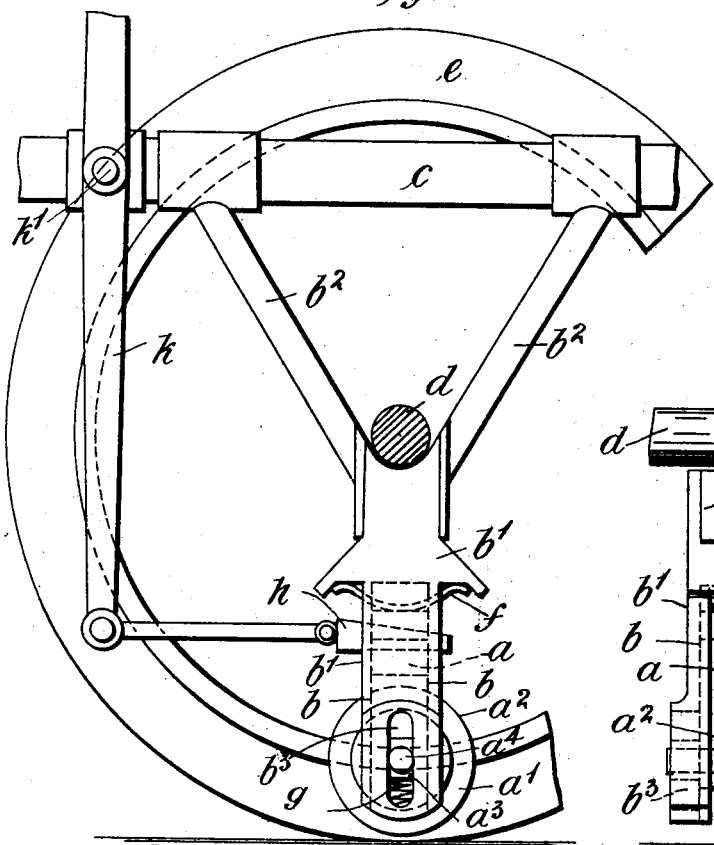
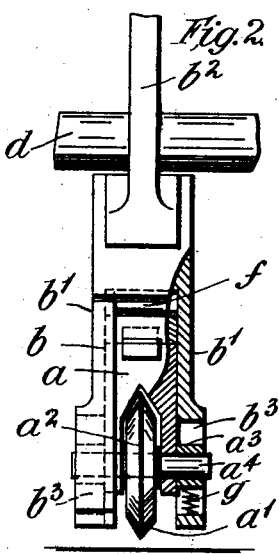
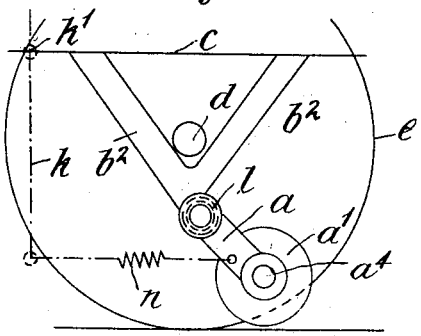
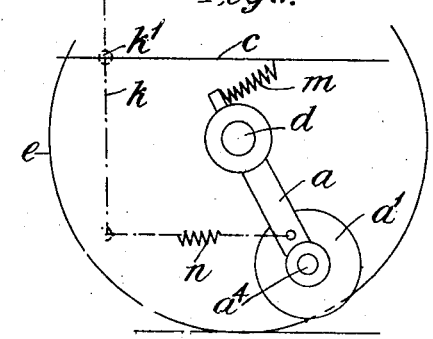
Witnesses
Frey. M. Goodwin.
Robt Hunter
Inventor William Rourke.
by His Attorney
Benj. V. King No. 764,960. Patented July 12, 1904.

UNITED STATES PATENT OFFICE.

WILLIAM ROURKE, OF BROMLEY, ENGLAND, ASSIGNOR OF ONE-HALF TO WILLIAM WRIGHT HORSBURGH, OF LONDON, ENGLAND.

FITTING FOR PREVENTING SIDE SLIP IN MOTOR-VEHICLES.

SPECIFICATION forming part of Letters Patent No. 764,960, dated July 12, 1904.

Application filed November 20, 1903. Serial No. 181,947. (No model.)

*To all whom it may concern:*

Be it known that I, WILLIAM ROURKE, a subject of the King of Great Britain and Ireland, residing at 9 Hawes road, Bromley, county of Kent, England, have invented certain new and useful Improvements in Fittings to Prevent Side Slip in Motor and other Vehicles, of which the following is a specification.

This invention relates to an attachable fitting for motor and other road vehicles with the object of preventing side slip on wet, very dry, or greasy roads, and this I effect by the application to the surface of the road of a revolving wheel or disk, as hereinafter set forth, reference being had to the accompanying sheet of drawings, in which—

Figure 1 is a side elevation; Fig. 2, an end elevation partly in section, and Figs. 3 and 4 modified forms of application in diagrammatical elevation.

Like letters of reference indicate corresponding parts.

In carrying my invention into practice I provide a movable bracket or arm $a$, arranged to rise and fall vertically, as in Figs. 1 and 2, or diagonally, as in Figs. 3 and 4, and at the outer end thereof I mount a revolving disk or wheel $a'$, having a roughened, spiked, or cutting edge $a^2$, designed to enter the surface of the road more or less, according to the amount of pressure applied when taking a curve or running on a road where the crown is much higher than the sides. This bracket or arm $a$ when the vertical arrangement is used I so arrange that it can slide up and down between guides $b$ of the casing $b'$, fixed by stays $b^2$ to the frame $c$ of the vehicle, and in the lower ends of said casing $b'$ I arrange slots $b^3$, adapted to receive and guide blocks $a^3$, carrying the axle $a^4$ of the wheel or disk $a'$, said wheel, if desired, being geared by chain or the like with the axle $d$ of the vehicle and running parallel with the wheel $e$ of the vehicle.

In order to prevent vibration and sudden shock due to inequalities of the road, I interpose between the casing $b'$ and bracket $a$ a spring $f$, as in Figs. 1 and 2, and in the lower end of the brackets $b'$ I arrange a spring $g$ for the purpose of lifting the wheel $a'$ clear of the ground when the device is to be out of operation. I may in practice operate my device by eccentric, screw, or other wedge movement if an ordinary lever is not found to be sufficiently powerful. In the present case I have shown a wedge $h$, adapted to force down the bracket $a$ by operating the handle or foot-lever $k$, pivoted at $k'$ to the frame.

In Fig. 3 the bracket $a$ is attached to the stays $b^2$ by means of a spring knuckle-joint $l$ to bring the wheel $a'$ clear of the road when inoperative or to allow of the same riding over an obstruction. In this case a spring or flexible connection $n$ is interposed between the bracket and operating-lever to permit of this.

In Fig. 4 I have shown the bracket $a$ attached to the axle $d$ of the vehicle, a spring $m$ keeping the wheel out of action, and in this case also I provide a spring or flexible connection $n$ between the bracket and operating lever or handle $k$ to allow the wheel to ride over obstructions.

If desired, I may attach my said device both to the axle and to the frame, allowing a certain amount of play between the axle and frame.

One or more of the fittings or attachments may be arranged on each vehicle, if necessary, and may be automatically operated by the disturbance of the center of gravity, setting free suitable mechanism adapted to operate the device.

Having now described my invention, what I claim as new, and desire to secure by Letters Patent, is—

1. In a device of the character described, a vertically-slidable arm, guides for the arm having slots near their lower ends, bearing-blocks slidable therein, a shaft journaled in the lower ends of the arm and in the blocks, springs in the slots of the guides for holding the blocks normally elevated and means for depressing the arm.

2. In a device of the character described, a casing having depending guides; bearing-blocks slidable with relation to the ends of the guides, an arm slidable between the guides, a shaft mounted in the arm and bearing-blocks normally elevated, and means for depressing the arm.

In testimony whereof I have affixed my signature in presence of two witnesses.

WILLIAM ROURKE.

Witnesses:
 BENJ. THOS. KING,
 ROBT. HUNTER.